(12) United States Patent
Rossholm et al.

(10) Patent No.: US 8,203,617 B2
(45) Date of Patent: Jun. 19, 2012

(54) APPARATUS AND METHOD FOR INCREASING CODING EFFICIENCY WITH AN ADAPTIVE PRE-FILTER

(75) Inventors: Andreas Rossholm, Malmö (SE); Per Thorell, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1469 days.

(21) Appl. No.: 11/734,166

(22) Filed: Apr. 11, 2007

(65) Prior Publication Data

US 2007/0216763 A1    Sep. 20, 2007

Related U.S. Application Data

(63) Continuation-in-part of application No. 10/701,730, filed on Nov. 5, 2003, now abandoned.

(60) Provisional application No. 60/846,458, filed on Sep. 22, 2006.

(51) Int. Cl.
*H04N 5/228* (2006.01)
*G06K 9/00* (2006.01)

(52) U.S. Cl. .................. 348/222.1; 382/165

(58) Field of Classification Search .......... None
See application file for complete search history.

(56) References Cited

U.S. PATENT DOCUMENTS

| | | | |
|---|---|---|---|
| 4,965,754 A | 10/1990 | Stansfield et al. | |
| 5,057,923 A * | 10/1991 | Matsuda | 348/240.2 |
| 5,768,431 A * | 6/1998 | Saunders et al. | 382/236 |
| 6,897,897 B2 | 5/2005 | Mise et al. | |
| 6,914,628 B1 * | 7/2005 | Kuwata et al. | 348/272 |
| 7,280,703 B2 * | 10/2007 | Gallagher et al. | 382/260 |
| 7,502,513 B2 * | 3/2009 | Linzer | 382/224 |
| 2003/0231794 A1 * | 12/2003 | Roberts | 382/167 |
| 2005/0094003 A1 | 5/2005 | Thorell | |

FOREIGN PATENT DOCUMENTS

| WO | WO 03/094497 A1 | 11/2003 |
|---|---|---|
| WO | WO 2006/043190 A1 | 4/2006 |

OTHER PUBLICATIONS

Fengling Li, et al, "Adaptively Weighted Update Steps Using Chrominance for Scalable Video Coding," 2005 IEEE, SIPS 2005, pp. 682-686.

Rossholm, et al.: "Chrominance Controlled Video Pre-Filter for Increased Coding Efficiency"; at International Symposium on Signal Processing and its Applications (ISSPA), Feb. 12-15, 2007, Sharjah, United Arab Emirates.

* cited by examiner

*Primary Examiner* — Albert Cutler

(57) ABSTRACT

A method and apparatus for processing a digital image in a Mobile Equipment operating in a telecommunications network. The digital image includes a frame of data having a plurality of pixels with data. The data of each pixel has a luminance value and a chrominance value. The method begins by obtaining chrominance value for a specified pixel of the digital image. Responsive to the obtained chrominance value, a strength to filter the specified pixel of digital image is determined. The specified pixel is then selectively and adaptively filtered at the determined strength of the filter. Preferably, chrominance values and luminance values for the specified pixel and an adjacent pixel is determined. A threshold for a variation in the range between a highest chrominance level and a lowest chrominance level of the specified pixel and the adjacent pixel is then set. The variation for the specified pixel is determined, and responsive to the value of the variation, low-pass filtering of the specified pixel is applied.

16 Claims, 5 Drawing Sheets

APPARATUS AND METHOD FOR INCREASING CODING EFFICIENCY WITH AN ADAPTIVE PRE-FILTER

CROSS-REFERENCE TO RELATED APPLICATIONS

This application is a continuation-in-part of U.S. application Ser. No. 10/701,730, filed Nov. 5, 2003 now abandoned, the disclosure of which is incorporated herein by reference. This application also claims benefit of U.S. Provisional Application No. 60/846,458 filed Sep. 22, 2006, the disclosure of which is incorporated herein by reference.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

This invention relates to mobile communication systems. More particularly, and not by way of limitation, the invention is directed to an apparatus and method for increasing coding efficiency with an adaptive pre-filter.

In mobile communication systems utilizing Mobile Equipment (ME), it is quite common to utilize a video recording playback feature. It is now possible to record a video clip or make a video telephony call over an ME. However, to accomplish these tasks, it is necessary to compress captured frame sequences. Currently, most existing video encoders are designed as a block-based motion-compensated hybrid difference/transform coder utilizing MPEG-4 or H.263 formats, where the transformation is accomplished by a Discrete Cosine Transform (DCT) on blocks of 8×8 pixels. To meet the demands for low bit-rates that exists in the mobile world today, these kinds of encoders mainly control the amount of bits allocated to each frame by changing the strength of the quantization. The quantization step divides the DCT coefficients with a fixed Quantization Parameter (QP). The quotient is then rounded to the nearest integer level and multiplied with the QP parameter to form a quantized coefficient. This quanitizaiton step has given rise to two main artifacts: blocking and ringing. Blocking artifacts are also due to Motion Compensation (MC), where it is the consequence of poor MC prediction and a combination of a relatively smooth prediction and coarsely quantized prediction error. The blocking artifact is perceived as an unnatural discontinuity between pixel values of neighboring blocks. The ringing artifact is perceived as high frequency irregularities around the edges in an image. Thus, the blocking artifacts are generated due to the blocks being processed independently and the ringing artifacts are caused by the coarse quantization of the high frequency components.

If the target bit-rate is fixed, the QP value chosen depends on the coding efficiency. A good coding efficiency results in a lower QP value. The main causes of decreased coding efficiency are that e.g. a camera sensor generates noise and that the captured sequence content is highly complex. The noise distortion from the sensor may be of a different characteristic, which affects the luminance or the color components and is usually increased in weaker light conditions. The complexity of the captured sequence depends on the amount of high frequency information and the fine details of the image, which are more difficult to predict for the encoder and thereby requires more bits to encode.

A pre-processing algorithm may be utilized prior to processing a video signal through an encoder, which may reduce the amount of camera disturbance and the complexity of the sequence, thereby increasing the coding efficiency. This may be performed, for example, by applying a low-pass filter on the input sequence. However, this results in smoothing of the entire frame and visually significant information, such as object edges, is lost. A pre-filter is required to preserve the visually significant information while removing or attenuating insignificant information, which results in an improved perceived video quality. Existing systems utilizing pre-filtering processing are limited compared to post-filtering processing. It has been suggested that a combined pre-post filter be utilized where the algorithm preserves the edges and filters (i.e., low pass) the non-edge region. To achieve the proper threshold in the post-filtering step, it is necessary to calculate the threshold on the encoder side, i.e. metadata and send it with the video data. Although this results in good video quality, this proposed system is not applicable for an ME in the cellular networks today because it is not possible to send this kind of meta data with the video data. In another approach, it has been proposed to utilize pre-processing in the rate-distortion framework. This is performed to increase the peak signal-to-noise ratio (PSNR) and reduce compression artifacts. However, this solution is far too complex for an ME. Additionally, in most MEs, it is not possible to use the rate-distortion framework since this involves an iteration of the encoding process. This proposed system also utilizes a Region-Of-Interest (ROI) to improve the perceived quality. However, in this pre-filter, the background outside the ROI is filtered with several Gaussian low-pass filters of different variance. By using several filters with their strengths based on the distance to the border of the ROI, the impact of border effects is decreased. For example, an ROI is found in the face of a person in a used sequence and is detected using a search for skin color. There are limitations to this proposed process because of the use of many ROIs and the differences of e.g. skin color which results in an incomplete solution.

To meet the requirement of an ME with low complexity and increased coding efficiency, a new approach is needed which utilizes the local variations in chrominance to determine the strength of low-pass filtering of the luminance. This approach decreases the complexity of the image because the amount of processed pixels is reduced. Thus, the coding efficiency is also increased because of high frequency components in textures with little variation in the chrominance are decreased as a result of the low-pass filtering.

It would be advantageous to have an apparatus and method which utilizes chrominance controlled video for increasing coding efficiency. The present invention provides such an apparatus and method.

BRIEF SUMMARY OF THE INVENTION

In one aspect, the present invention is directed to a method of processing a digital image in a Mobile Equipment operating in a telecommunications network. The digital image includes a frame of data having a plurality of pixels with data. The data of each pixel has a luminance value and two chrominance values. The method begins by obtaining chrominance value for a specified pixel of the digital image. Responsive to the obtained chrominance value, a strength to filter the specified pixel of the digital image is determined. The specified pixel is then selectively and adaptively filtered at the determined strength of the filter. Preferably, chrominance values and luminance values for the specified pixel and an adjacent pixel is determined. A threshold for the variation or gradient calculated between a highest chrominance level and a lowest chrominance level of the specified pixel and the adjacent pixel is then set. The variation for the specified pixel is determined, and responsive to the value of the variation, low-pass filtering of the specified pixel is applied.

In another aspect, the present invention is directed to an apparatus for processing a digital image in a Mobile Equipment operating in a telecommunications network. The apparatus obtains chrominance value for a specified pixel of the digital image and determines a strength to filter the specified pixel of the digital image responsive to the obtained chrominance value. The apparatus also includes a filter for filtering the specified pixel at the determined strength of the filter. The apparatus also obtains chrominance values and luminance values for the specified pixel and an adjacent pixel. A threshold for a variation in the range between a highest chrominance level and a lowest chrominance level of the specified pixel and the adjacent pixel is then set. The variation for the specified pixel is then determined, and responsive to the value of the variation, the specified pixel is filtered by the filter.

BRIEF DESCRIPTION OF THE SEVERAL VIEWS OF THE DRAWING

In the following, the features of the invention will be described in detail by showing preferred embodiments, with reference to the attached figures in which.

DETAILED DESCRIPTION OF THE INVENTION

The present invention is an apparatus and method of increasing coding efficiency for video streams transmitted over a telecommunications network. Existing mobile networks logically divide the infrastructure into a Core Network and an Access Network. The basic Core Network includes circuit-switched nodes, such as Mobile Switching Centers (MSCs), packet-switched nodes, such as General Packet Radio Service support nodes (SGSNs) and control nodes, such as Home Location Registers (HLRs). The basic Access Network includes radio control nodes and radio access nodes. The radio control nodes may include Base Station Controllers (BSCs) for GSM (Global System for Mobile Communications) radio networks and Radio Network Controllers (RNCs) for UMTS (Universal Mobile Telecommunications System) radio networks. In addition, the radio access nodes may be Base Transceiver Stations (BTSs) for GSM radio networks and Node BSCs for UMTS radio networks. Current mobile networks also partly utilize a layered network architecture. Call control and connectivity, which have traditionally been bundled in telecommunications networks, are now separate layers within the Core Network circuit-switched domain. This separation is achieved by dividing the MSCs into Media Gateways and network servers. The call control layer is resident in the MSC servers, while the connectivity layer is resident in the Media Gateways. The Media Gateways serve to bridge the different transmission technologies and to add service to end-user connections. The Media Gateways use open interfaces to connect between the Core Network and an Access network. The media gateway control interface (H.248) facilitates this separation of call control and connectivity layers. Media Gateways are located within the Core Network as an interface to both the Access Networks and to legacy networks, such as the Public Switched Telephone Network (PSTN).

Figure 1:
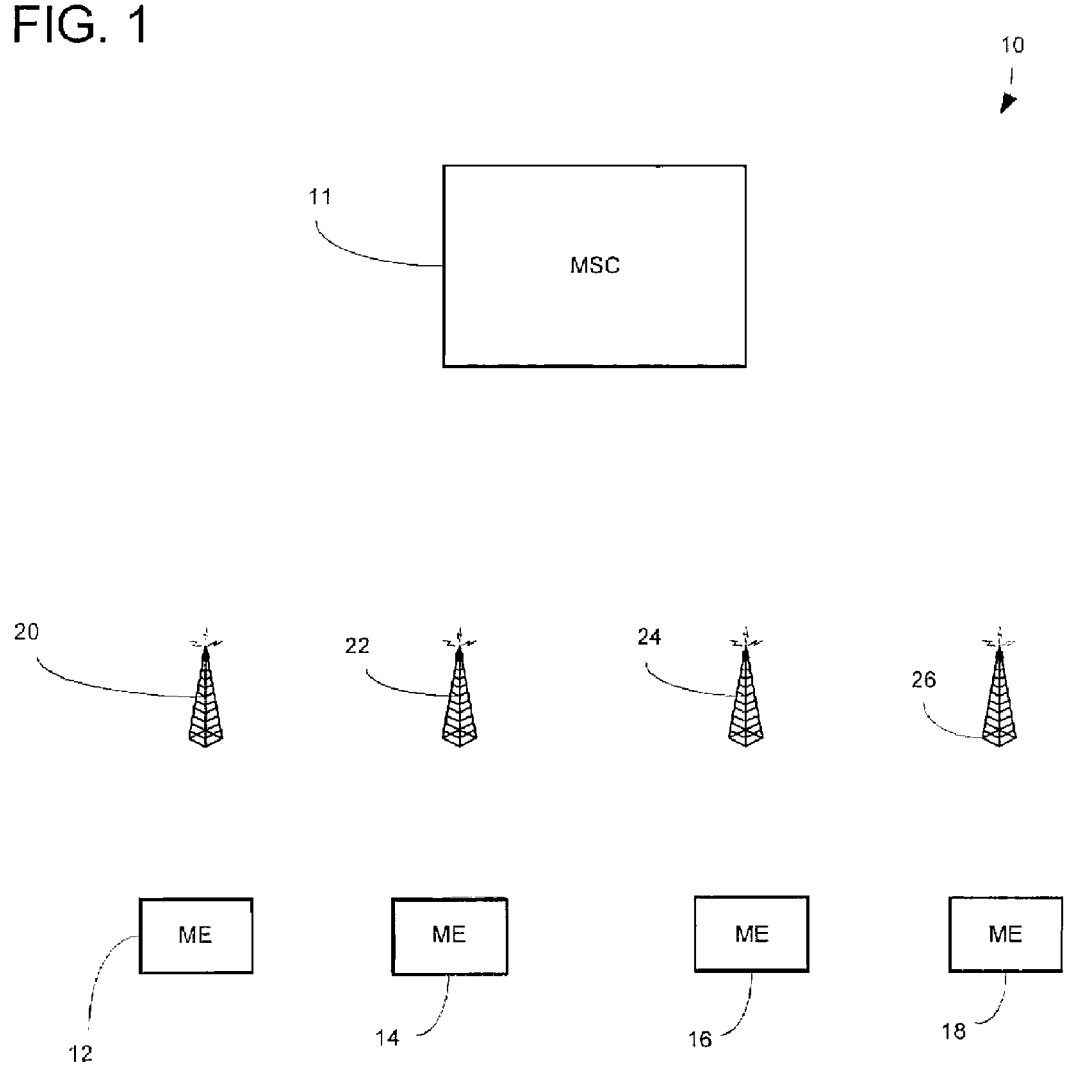
FIG. 1 is a simplified block diagram of components of a telecommunications network in a preferred embodiment of the present invention.

FIG. 1 is a simplified block diagram of components of a telecommunications network 10 in a preferred embodiment of the present invention. The telecommunications network includes an MSC 11 communicating with a plurality of MEs 12, 14, 16, and 18 through BSs 20, 22, 24, and 26. The MEs may be utilized to provide wireless voice and/or data communications. The ME may utilize video capture devices (cameras) for recording and playing digital frames of video content.

When transmitting images and/or video content over a wireless interface, a bandwidth of the transmission may be reduced by filtering the image and/or video content before transmission. Data representing the image and/or video, for example. may be subjected to low-pass filtering to reduce high frequency components of the image and/or video that may consume a relatively large amount of bandwidth while being relatively difficult to perceive and/or providing relatively little visual information. Moreover, a strength of filtering of the data may be varied on a pixel by pixel basis so that visually important information such as edges between objects can be preserved while high frequency components that may be more difficult to perceive or may not be as visually important are filtered more strongly.

Additionally, each pixel of a frame of digital image and/or video data may have a luminance value and a plurality of chrominance value associated with it. The luminance value of a current pixel may then be filtered with a strength of filtering of the luminance value being based on a comparison of chrominance values of the current and at least one adjacent pixel. The filtered image and/or video data may then be encoded before transmission to another device and/or storage in memory to further reduce a bandwidth consumed in transmission and/or to further reduce memory consumed in storage.

Figure 2:
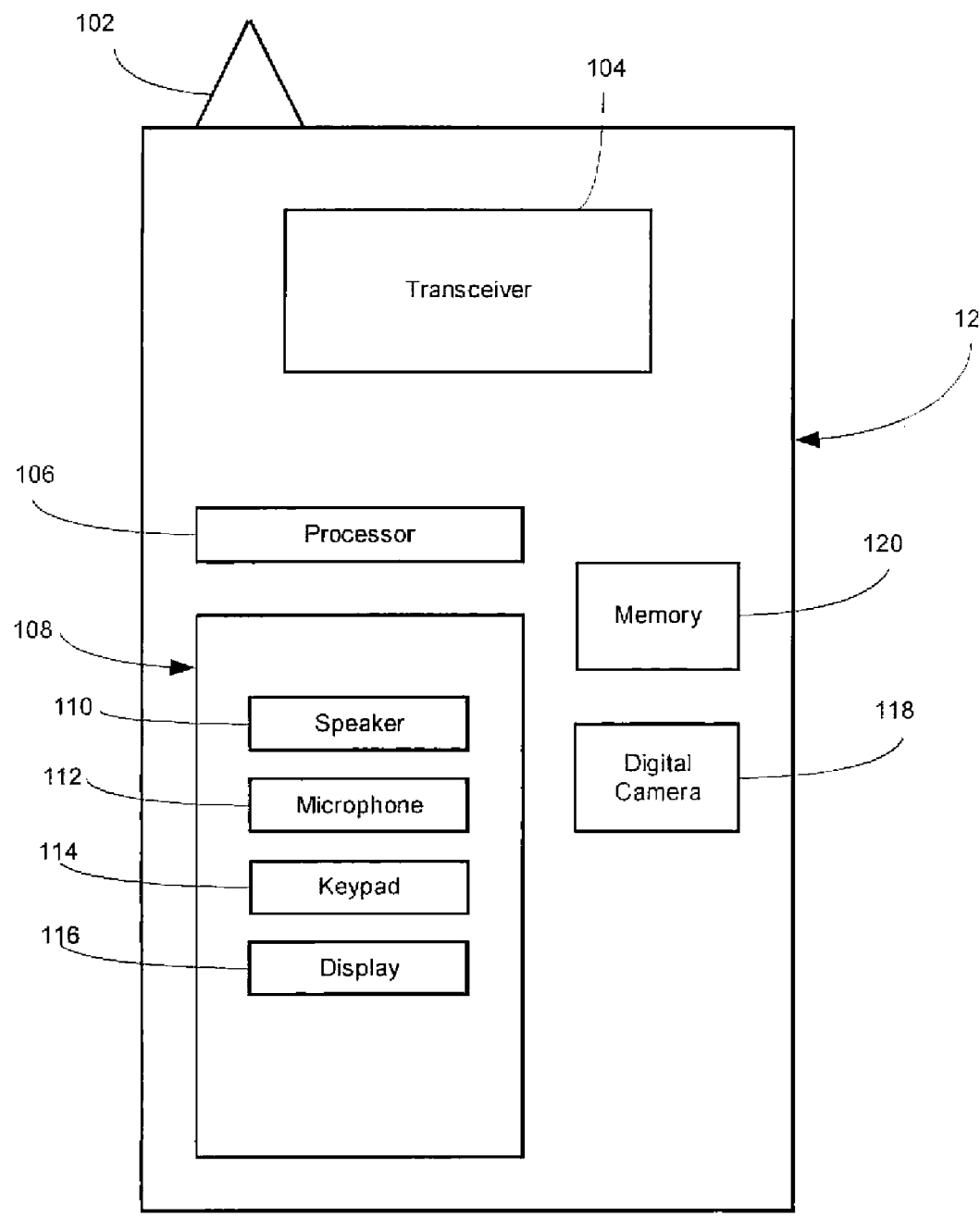
FIG. 2 is a simplified block diagram of components of an exemplary ME utilized in a telecommunications network of FIG. 1.

FIG. 2 is a simplified block diagram of the components of an exemplary ME 12 utilized in the telecommunications network 10 of FIG. 1. The ME 12 may include an antenna 102, a transceiver 104, a processor 106, a user interface 108 having a speaker 110, a microphone 112, a keypad 114, and a display 116. The ME may also have a digital camera 118 and a memory 120.

Figure 3:
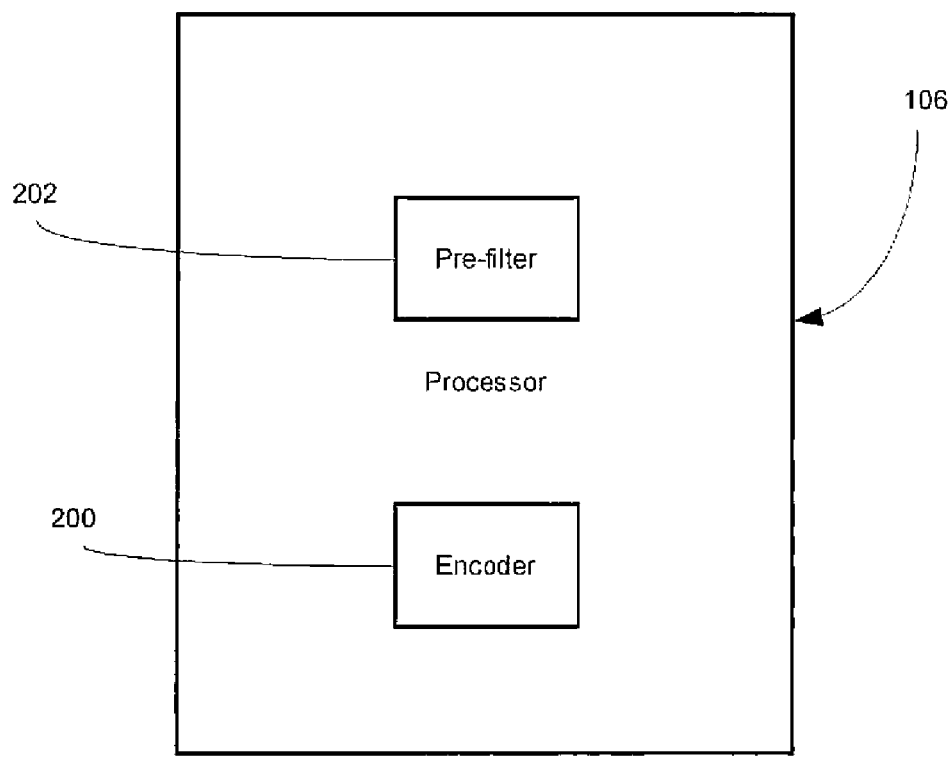
FIG. 3 is a simplified block diagram of a processor for processing video images in a preferred embodiment of the present invention.

FIG. 3 is a simplified block diagram of a processor 106 for processing video images in a preferred embodiment of the present invention. The processor includes an encoder 200 and a pre-filter 202. An algorithm within the pre-filter 202 utilizes chrominance data to determine the strength and amount of filtering to be applied. This is achieved by estimating the local variation or gradient in the chrominance. By determining a threshold for the variation in the range between a highest and a lowest variation for the processed frame, it is possible to control the amount of data to be filtered. In this range, the strength of the low-pass filter is increased with lower variation. By utilizing several filter strengths, self-introduced discontinuities between filtered and non-filtered areas are minimized. Since the frame may contain areas where there are no chrominance (e.g., black and white text), the algorithm must also consider the variation of the luminance. However, this is only performed when the chrominance is close to zero or 128 according to YCbCr color space developed as part of the International Telecommunications Union standard ITU-R BT.601-5. In particular, the data is provided in a YCrCb format where Y is a luminance value and Cr is a red chrominance value and Cb is a blue chrominance value for each pixel.

In a preferred embodiment of the present invention, low-pass filtering is utilized in the processor 106. In one embodiment, a Gaussian Pyramid filter bank is used wherein the input image is filtered and sub-sampled to a lower resolution. The filter is separable, which reduces the computational requirement and is zero-phased to avoid phase induced distortion. In addition, the filter does not introduce any bias. The separable filter of size 5×5 is generated by a one-dimensional (1-D) kernel:

$$h(0) = a, h(1) = h(-1)\frac{1}{4}, h(2) = h(-2) = \frac{1}{4} - \frac{a}{2} \quad (1)$$

where the constant a may be chosen from a range of 0:3 to 0:6 depending on the decided strength. However, any low-pass filtering process may be utilized.

The adaptation utilized in the filtering process is based on the amount of filtering that is desired, which is a result of the requested bit-rate. For example, if a lower bit-rate is requested, a higher QP-value is needed. This results in more undesired artifacts. To reduce these artifacts, the pre-filter 202 increases the amount of low-pass filtering to increase the coding efficiency.

Figure 4A:
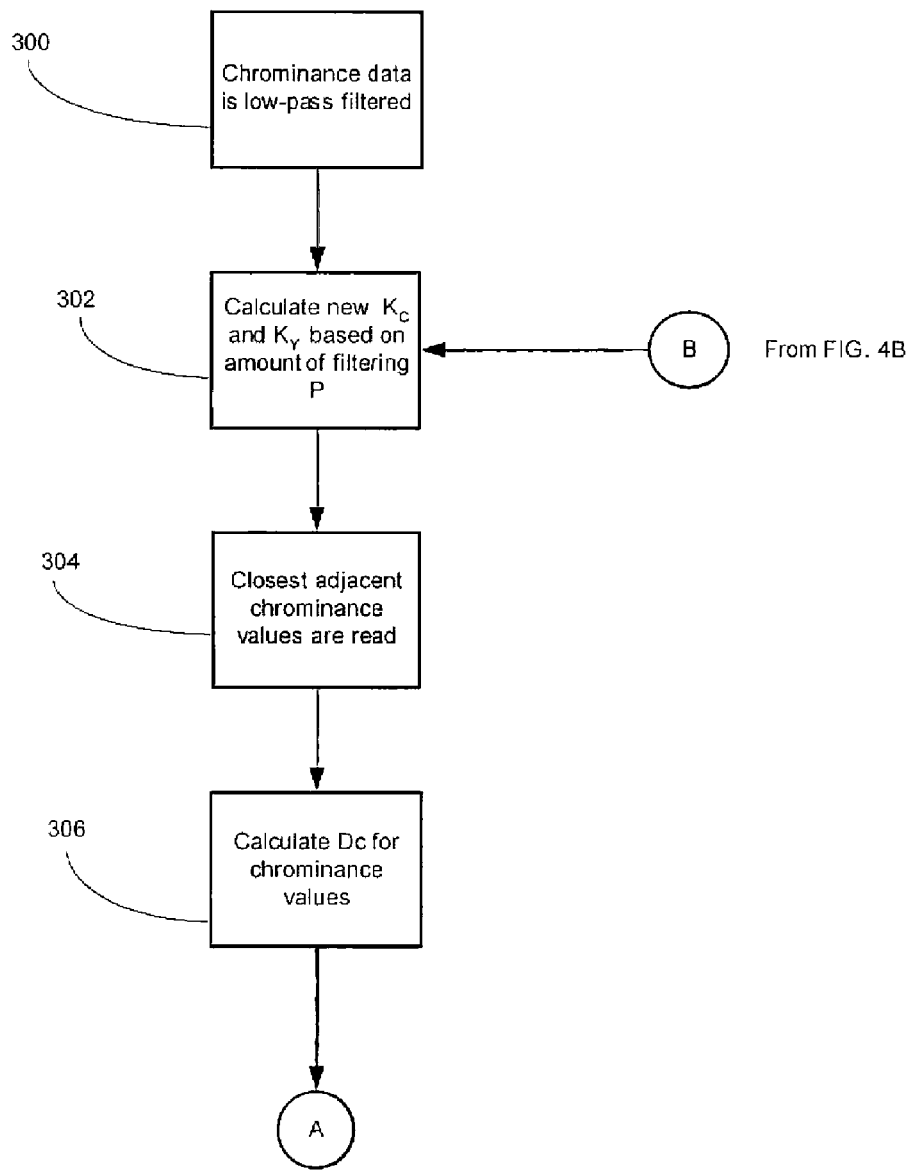
FIGS. 4A and 4B are flow charts outlining the steps for utilizing an adaptive pre-filter according to teachings of the present invention.
Figure 4B:
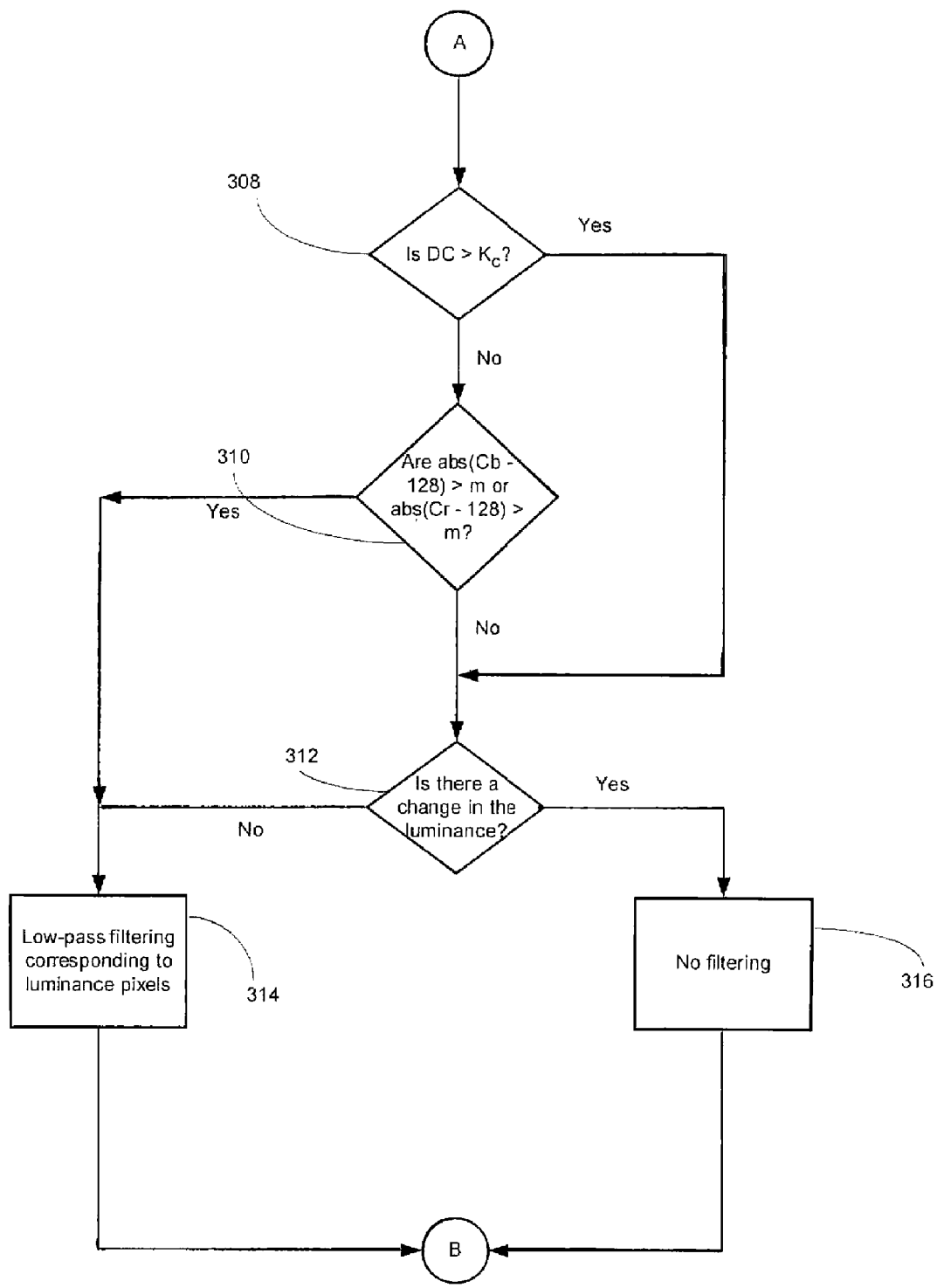

FIGS. 4A and 4B are flow charts outlining the steps for utilizing the adaptive pre-filter 202 according to the teachings of the present invention. With reference to FIGS. 1-4, the method will now be explained. The method begins with step 300 where the chrominance data of the image is low-pass filtered. This is performed to reduce (camera) distortion in the chrominance channels. Next, in step 302, new threshold values $K_C$ and $K_Y$ based on P are calculated, where P is the requested amount of filtered pixels and $K_C$ and $K_Y$ are the estimated values of maximum variance that correspond to P. The method then moves to step 304 where the closest adjacent chrominance values are read. Next, in step 306, $D_C$ is calculated. $D_C$ is the maximum chrominance variation for pixels (m, n). There are several ways to measure this parameter. In one embodiment of the invention. this may be accomplished by performing the following calculation:

$$D_C = \max[(Cr(m, n) - Cr(m - i_{Cr}, n - j_{Cr}))^2 + \quad (2)$$
$$(Cb(m, n) - Cb(m - i_{Cb}, n - j_{Cb}))^2]$$

where $i_{Cr}$; $j_{Cr}$ and $i_{Cb}$; $j_{Cb}$ are the distances for variation calculation.

The method then moves to step 308 where it is determined if $D_C$ is greater than the pre-calculated $K_C$. In step 308, if it is determined that $D_C > K_C$, then no filtering is accomplished and the method moves to step 312. However, in step 308, if it is not determined that $D_C > K_C$, (e.g., $D_C < K_C$), the method then moves from step 308 to step 310 where the Cb and Cr are evaluated. Specifically, in step 310, if it is determined if abs(Cb−128)>r or abs(Cr−128)>r, where r decides the range where a pixel is regarded to include no color information, then the method moves to step to step 314 where low-pass filtering corresponding to the luminance pixels is accomplished since some chrominance is present. There are N strength levels for the low-pass filter where the weakest starts at $D_C$. The following formula may be used:

$$M_r = 128 \pm r \quad (3)$$

where $M_r$ are the decided no color range based on r. The method then moves from step 314 back to step 302 where new threshold values $K_C$ and $K_Y$ based on P are calculated.

However in step 310, if it is determined that abs(Cb)<r or abs(Cr)<r, there is no chrominance included and the luminance data for any corresponding pixel requires evaluation. Thus, the method moves from step 310 to step 312 where the luminance variation is calculated. The luminance variation $D_Y$ is calculated by:

$$D_Y = \max[Y(m - i_Y, n - j_Y)] - \min[Y(m - i_Y, n - j_Y)] \quad (4)$$

where $i_Y$; $j_Y$ and $i_Y$; $j_Y$ are the distances for variation calculation. In step 312, if the variation $D_Y < K_Y$ in the luminance is determined, then the method moves from step 312 to step 314 where low-pass filtering is performed. There are N strength levels for the low-pass filter where the weakest starts at $D_Y = K_Y$. In step 312, if it is determined that $D_Y > K_Y$, the method moves to step 316 where no filtering is accomplished. The method then returns to step 302 where new threshold values $K_C$ and $K_Y$ based on P are calculated. When a new $K_C$ and $K_Y$ are calculated in step 302, the actual amount of filtering P is also calculated and, based on this, it is determined if $K_C$ and $K_Y$ should be increased or decreased. However, to ensure that the image frame is not be totally smoothed, a maximum value for $K_C$, $K_Y$, $K_{CMAX}$, and $K_{YMAXi}$ is preferably established. In an alternate embodiment of the present invention, the processor 106 may utilize the encoder 200 to inform the adaptive filter if the QP-value decreases (e.g., K should also decrease). This may occur in a situation where a static session is encoded. The encoder may then increase the coding quality by time, thereby decreasing the need for pre-filtering. Thus, the present invention provides an apparatus and method to increase the coding efficiency by applying an adaptive and selective pre-filter. The filter provides an implementation which has low complexity and exploits chrominance data to determine which areas to low-pass filter. The apparatus method may be applied to video sequences to enhance the perceived quality while keeping a constant bit-rate.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed is:

1. A method of processing a digital image in a Mobile Equipment operating in a telecommunications network, the digital image having a frame of data comprising a plurality of pixels with data, the data of each pixel having a luminance value and a chrominance value, the method comprising the steps of:

obtaining the chrominance value for a specified pixel of the digital image;

responsive to the obtained chrominance value, determining a strength of a filter to be used to filter the luminance value of the specified pixel of digital image, wherein the determining step includes:

receiving chrominance and luminance values for the specified pixel and an adjacent pixel; and setting a threshold for a variation or gradient in the range between a highest chrominance level and a lowest chrominance level of the specified pixel and the adjacent pixel;

when the luminance value of the specified pixel is filtered, filtering the luminance value of the specified pixel at the determined strength of the filter;

wherein the data is provided in a YCrCb format, where Y is a luminance value, Cr is a red chrominance value, and Cb is a blue chrominance value for each pixel, and the method further comprises:

determining whether the absolute value of Cb minus 128 or the absolute value of Cr minus 128 for the specified pixel is greater than a parameter representing lack of color information in the specified pixel; and when it is determined that the absolute value of Cb minus 128 or the absolute value of Cr minus 128 is greater than the parameter, low-pass filtering the luminance value of the specified pixel.

2. The method of processing a digital image in a Mobile Equipment operating in a telecommunications network of claim 1 further comprising, prior to determining the strength of the filter to be used to filter the luminance value of the specified pixel, a step of low-pass filtering the chrominance value of the specified pixel.

3. The method of processing a digital image in a Mobile Equipment operating in a telecommunications network of claim 1 wherein the strength of the filter is increased with a lower variation in the range between a highest chrominance level and a lowest chrominance level.

4. The method of processing a digital image in a Mobile Equipment operating in a telecommunications network of claim 1 further comprising the steps of:

determining if the maximum variation is greater than the threshold value; and responsive to determining if the maximum variation is greater than the threshold value, filtering the luminance value of the specified pixel.

5. The method of processing a digital image in a Mobile Equipment operating in a telecommunications network of claim 4 wherein if is determined that the maximum variation is greater than the threshold value, applying no filtering upon the luminance value of the specified pixel.

6. The method of processing a digital image in a Mobile Equipment operating in a telecommunications network of claim 4 wherein if is determined that the maximum variation is less than the threshold value, the method includes the step of determining the luminance value of the specified pixel and filtering the luminance from the specified pixel.

7. The method of processing a digital image in a Mobile Equipment operating in a telecommunications network of claim 1 further comprising, after the step of filtering the luminance value of the specified pixel, the step of encoding data of a plurality of filtered pixels of the digital image prior to transmission from the Mobile Equipment.

8. A method of processing a digital image in a Mobile Equipment operating in a telecommunications network, the digital image having a frame of data comprising a plurality of pixels with data, the data of each pixel having a luminance value and a chrominance value, the method comprising the steps of:

obtaining the chrominance value for a specified pixel of the digital image;

responsive to the obtained chrominance value, determining a strength of a filter to be used to filter the luminance value of the specified pixel of digital image, wherein the determining step includes:

receiving chrominance and luminance values for the specified pixel and an adjacent pixel; and setting a threshold for a variation or gradient in the range between a highest chrominance level and a lowest chrominance level of the specified pixel and the adjacent pixel;

when the luminance value of the specified pixel is filtered, filtering the luminance value of the specified pixel at the determined strength of the filter;

wherein the data is provided in a YCrCb format, where Y is a luminance value, Cr is a red chrominance value, and Cb is a blue chrominance value for each pixel, and the method further comprises:

determining whether the absolute value of Cb minus 128 or the absolute value of Cr minus 128 for the specified pixel is greater than a parameter representing lack of color information in the specified pixel; and when it is determined that the absolute value of Cb minus 128 or the absolute value of Cr minus 128 is less than the parameter, the step of passing the luminance value of the specified pixel without filtering.

9. An apparatus for processing a digital image in a Mobile Equipment operating in a telecommunications network, the digital image having a frame of data comprising a plurality of pixels with data, the data of each pixel having a luminance value and a chrominance value, the apparatus configured to perform the following:

obtain chrominance value for a specified pixel of the digital image;

determine a strength of a filter to be used to filter the luminance value of the specified pixel of the digital image responsive to the obtained chrominance value, wherein the apparatus is configured to:

receive chrominance and luminance values for the specified pixel and an adjacent pixel; and set a threshold for a variation in the range between a highest chrominance level and a lowest chrominance level of the specified pixel and the adjacent pixel;

when the luminance value of the specified pixel is filtered, perform filtering of the luminance value of the specified pixel at the determined strength of the filter;

wherein the data is provided in a YCrCb format, where Y is a luminance value, Cr is a red chrominance value, and Cb is a blue chrominance value for each pixel, and the apparatus is further configured to:

determine whether the absolute value of Cb minus 128 or the absolute value of Cr minus 128 for the specified pixel is greater than a parameter representing lack of color information in the specified pixel; and low-pass filter the luminance value of the specified pixel when it is determined that the absolute value of Cb minus 128 or the absolute value of Cr minus 128 is greater than the parameter.

10. The apparatus for processing a digital image in a Mobile Equipment operating in a telecommunications network of claim 9 comprising a low-pass filter for filtering the chrominance value of the specified pixel.

11. The apparatus for processing a digital image in a Mobile Equipment operating in a telecommunications network of claim 9 wherein the strength of the filter is increased with a lower variation in the range between a highest chrominance level and a lowest chrominance level.

12. The apparatus for processing a digital image in a Mobile Equipment operating in a telecommunications network of claim 9 further configured to perform the following:
   determine if the maximum variation is greater than the threshold value; and
   responsive to determining if the maximum variation is greater than the threshold value, filter the luminance value of the specified pixel.

13. The apparatus for processing a digital image in a Mobile Equipment operating in a telecommunications network of claim 12 wherein if is determined that the maximum variation is greater than the threshold value, the apparatus is configured to apply no filtering upon the luminance value of the specified pixel.

14. The apparatus for processing a digital image in a Mobile Equipment operating in a telecommunications network of claim 12 wherein if is determined that the maximum variation is less than the threshold value, the apparatus is configured to determine the luminance value of the specified pixel and filter the luminance from the specified pixel.

15. The apparatus for processing a digital image in a Mobile Equipment operating in a telecommunications network of claim 9, wherein the apparatus is further configured to encode data of a plurality of filtered pixels of the digital image prior to transmission from the Mobile Equipment.

16. An apparatus for processing a digital image in a Mobile Equipment operating in a telecommunications network, the digital image having a frame of data comprising a plurality of pixels with data, the data of each pixel having a luminance value and a chrominance value, the apparatus configured to perform the following:
   obtain chrominance value for a specified pixel of the digital image;
   determine a strength of a filter to be used to filter the luminance value of the specified pixel of the digital image responsive to the obtained chrominance value, wherein the apparatus is configured to:
   receive chrominance and luminance values for the specified pixel and an adjacent pixel; and
   set a threshold for a variation in the range between a highest chrominance level and a lowest chrominance level of the specified pixel and the adjacent pixel;
   when the luminance value of the specified pixel is filtered, perform filtering of the luminance value of the specified pixel at the determined strength of the filter;
   wherein the data is provided in a YCrCb format, where Y is a luminance value, Cr is a red chrominance value, and Cb is a blue chrominance value for each pixel, and the apparatus is further configured to:
   determine whether the absolute value of Cb minus 128 or the absolute value of Cr minus 128 for the specified pixel is greater than a parameter representing lack of color information in the specified pixel; and
   pass the luminance value of the specified pixel without filtering when it is determined that the absolute value of Cb minus 128 or the absolute value of Cr minus 128 is less than the parameter.

* * * * *